US007093111B2

(12) United States Patent
Frommer et al.

(10) Patent No.: US 7,093,111 B2
(45) Date of Patent: Aug. 15, 2006

(54) RECOVERY OF GLOBAL HISTORY VECTOR IN THE EVENT OF A NON-BRANCH FLUSH

(75) Inventors: Scott B. Frommer, Cold Spring, NY (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/631,055

(22) Filed: Jul. 31, 2003

(65) Prior Publication Data
US 2005/0027975 A1    Feb. 3, 2005

(51) Int. Cl.
*G06F 9/00*    (2006.01)
(52) U.S. Cl. .................. 712/239; 712/244; 712/240
(58) Field of Classification Search ............... 712/239, 712/244, 240
See application file for complete search history.

(56) References Cited

U.S. PATENT DOCUMENTS

| | | | | |
|---|---|---|---|---|
| 5,822,575 A * | 10/1998 | Tran | ............................ | 712/239 |
| 5,864,697 A * | 1/1999 | Shiell | ......................... | 712/240 |
| 6,055,630 A * | 4/2000 | D'Sa et al. | .................. | 712/240 |
| 6,108,776 A * | 8/2000 | Check et al. | ................ | 712/240 |
| 6,189,091 B1 * | 2/2001 | Col et al. | ................... | 712/240 |
| 6,526,502 B1 * | 2/2003 | Col et al. | ................... | 712/239 |
| 6,598,152 B1 * | 7/2003 | Sinharoy | ..................... | 712/228 |
| 6,745,323 B1 * | 6/2004 | Sinharoy | ..................... | 712/240 |
| 6,823,446 B1 * | 11/2004 | Sinharoy | ................... | 712/239 |
| 6,877,089 B1 * | 4/2005 | Sinharoy | ..................... | 712/239 |

OTHER PUBLICATIONS

Tse-Yu Yeh et al. "Two-Level Adaptive Training Branch Prediction," *ACM/IEEE Int Symp on Microarchitecture*, Nov. 1991, 14 pages.
Scott McFarling "Combining Branch Predictors," *WRL Technical Note TN-36, Western Research Laboratory*, Jun. 1993, 29 pages.

* cited by examiner

*Primary Examiner*—Eddie Chan
*Assistant Examiner*—Kevin P. Rizzuto
(74) *Attorney, Agent, or Firm*—Robert A. Voigt, Jr.; Winstead Sechrest & Minick P.C.; Casimer K. Salys

(57) ABSTRACT

A method and system for recovering a global history vector. In the event of a non-branch flush, a tag may be received by a queue configured to store information about branch instructions. The queue may read a copy of the global history vector from an entry indexed by the tag. This copy may be inserted in a global history vector mechanism ("GHV mechanism") configured to manage the global history vector. If the flush operation is a flush to a group of instructions that contains no branch instructions and the tag does not equal the next-to-write pointer in the queue, then the queue may transmit a command to the GHV mechanism to enter a mode where the GHV mechanism does not update the global history vector until the next branch instruction is fetched.

20 Claims, 7 Drawing Sheets

RECOVERY OF GLOBAL HISTORY VECTOR IN THE EVENT OF A NON-BRANCH FLUSH

TECHNICAL FIELD

The present invention relates to the field of data processors, and more particularly to recovering a global history vector in the event of a non-branch flush to a fetch group of instructions that contains no branch instructions.

BACKGROUND INFORMATION

Microprocessors may achieve efficient execution of instructions by implementing a mechanism, commonly referred to as a branch prediction mechanism. A branch prediction mechanism indicates a predicted direction (taken or not taken) for a branch instruction, allowing subsequent instruction fetching to continue along the predicted instruction stream indicated by the branch prediction. A branch instruction is an instruction which causes subsequent instructions to be fetched from one of at least two addresses a sequential address identifying an instruction stream beginning with instructions which directly follow the branch instruction; and a target address identifying an instruction stream beginning at an arbitrary location in memory. A branch instruction, referred to as an "unconditional branch instruction", always branches to the target address, while a branch instruction, referred to as a "conditional branch instruction", may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect, i.e., one or more branch instructions are predicted incorrectly, then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. Among the methods used to predict branches are local branch prediction and global branch prediction. Local branch prediction involves making a prediction based on the behavior of a particular branch the past few times it was executed. Local branch prediction is most effective for branches exhibiting a strong tendency towards a particular outcome. On the other hand, global branch prediction involves making a branch prediction based on the path of execution, i.e., the history of the last few branches to have been executed. Global branch prediction is useful when the behavior of a branch is related to the behavior of the prior executed branches.

Global branch prediction may implement a special shift-register storing a bit-vector, referred to as a "global history vector", that represents the recent path of execution. For example, the global history vector may store n bits of data. Each bit of data may be associated with a group of instructions, e.g., eight instructions, that had been fetched such as from an instruction cache. The position of a bit in the global history vector corresponds to how recently the associated group of instructions was fetched. For example, the least significant bit in the global history vector may represent the most recent fetch and the $n^{th}$ most significant bit may represent n fetches ago. If the group of instructions fetched contained a branch instruction whose branch was taken, then a "1" may be indicated in the global history vector corresponding to that group of instructions. Otherwise, a "0" may be indicated in the global history vector. That is, a "0" may be indicated in the global history vector if the corresponding group of instructions did not contain a branch instruction or if the group of instructions did contain one or more conditional branch instructions and each of these branches were not taken. Upon each successive fetch of a group of instructions, the global history vector is updated by shifting in an appropriate "1" or "0" and discarding the oldest bit.

If the group of instructions fetched contains a branch instruction, then a copy of the global history vector along with other information may be stored in a queue, referred to as a "branch information queue". The global history vector may be stored in the branch information queue in order to recover the global history vector in the event of a branch mispredict. As stated above, in the event of a branch mispredict, i.e., in the event the predicted instruction stream is incorrect, the instructions from the incorrectly prediction instruction are discarded. Further, in the event of a branch mispredict, certain registers and mechanisms within the processor, including the global history vector and the branch information queue, must be restored to the same state that existed immediately before the discarded instructions were fetched. The discarding of instructions in the event of a branch mispredict may be referred to as a "branch flush."

In the event of a "non-branch" flush operation, the global history vector may be discarded. A non-branch flush may refer to a flush operation (discarding of all instructions between the most recently fetched instructions and some instructions fetched earlier ) not resulting from a branch misprediction, i.e., not resulting from an incorrectly predicted instruction stream. For example, a non-branch flush operation may be enacted to handle a "livelock" situation such as when a thread in a multi-thread system cannot make forward progress because of a resource being locked. In another example, a non-branch flush operation may be enacted when a system call instruction is fetched and later identified after a number of instructions had been fetched. The instructions fetched after the system call was fetched may have to be flushed.

The global history vector may be recoverable in a non-branch flush if the flush is to a fetch group (group of instructions fetched) that contains a branch instruction. The global history vector may be recoverable as a copy of the global history vector may have been stored in the branch issue queue for that branch instruction. However, the global history vector is not recoverable in a non-branch flush if the flush is to a fetch group that does not contain a branch instruction. The branch information queue may only contain a copy of the global history vector for a branch instruction and not for a non-branch instruction. Consequently, the global history vector must be reconstructed. If the global history vector is n bits long, then it will require n correctly predicted fetches to be reconstructed. If a correct prediction as to whether a conditional branch instruction should be taken or not taken depends on the global history vector, then branch mispredictions may occur until the global history vector has finished being reconstructed which may retard the process of reconstructing the global history vector. If non-branch flushes are frequent, then frequent branch mispredictions may occur thereby adversely affecting performance.

Therefore, there is a need in the art to recover a global history vector in the event of a non-branch flush to a fetch group of instructions that contains no branch instructions.

SUMMARY

The problems outlined above may at least in part be solved in some embodiments by having the global history vector mechanism recover and save a global history vector from the branch information queue until needed upon the event of a non-branch flush to a fetch group of instructions that contains no branch instructions. The global history vector saved is the global history vector associated with the branch instruction previously fetched that is closest to the address flushed to but not preceding it, and not following the last address fetched at the time of the flush. Further, upon the event of a non-branch flush to a fetch group of instructions that contains no branch instructions, the global history vector mechanism may enter a mode of not updating the global history vector. Upon the fetching of the next branch instruction after the flush (referring to the branch instruction previously fetched that was later flushed that is closest to the address flushed to but not following the last address fetched at the time of the flush), the global history vector mechanism may resume updating the global history vector by shifting in an appropriate "1" or "0" and discarding the oldest bit.

In one embodiment of the present invention, a method for recovering a global history vector in the event of a non-branch flush to a fetch group of instructions that contains no branch instructions may comprise the step of receiving a tag pointing to an entry in a queue where the tag is associated with a flush operation. The method may further comprise flushing instructions between an address flushed to and a last address fetched at time of the flush operation. The method may further comprise resetting a next-to-write pointer in the queue using the received tag. The method may further comprise reading a global history vector from the queue in the entry indexed by the tag. The method may further comprise inserting a copy of the global history vector read into a global history vector mechanism where the global history vector mechanism is configured to update the global history vector in a first mode. The method may further comprise transmitting a command to the global history vector mechanism to enter a second mode if the flush operation is a flush to a group of instructions that contains no branch instructions and the tag does not equal the next-to-write pointer. In the second mode, the global history vector mechanism does not update the global history vector.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for recovering a global history vector in the event of a non-branch flush to a flush group of instruction that contains no branch instructions. In one embodiment of the present invention, in the event of a non-branch flush, a tag, associated with the flush operation, may be received by a branch information queue configured to store information about branch instructions. A next-to-write pointer (referring to a pointer that points to the next entry in the branch information queue to store information regarding a branch instruction) may be reset using the received tag. The branch information queue may read a copy of the global history vector from an entry indexed by the tag. The copy of the read global history vector may be inserted in a global history vector mechanism configured to manage the global history vector. If the flush operation is a flush to a group of instructions that contains no branch instructions and the received tag does not equal the next-to-write pointer, then the branch information queue may transmit a command to the global history vector mechanism to enter a mode where the global history vector mechanism does not update the global history vector until the next branch instruction is fetched.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

FIG. 1—Processor

Figure 1:
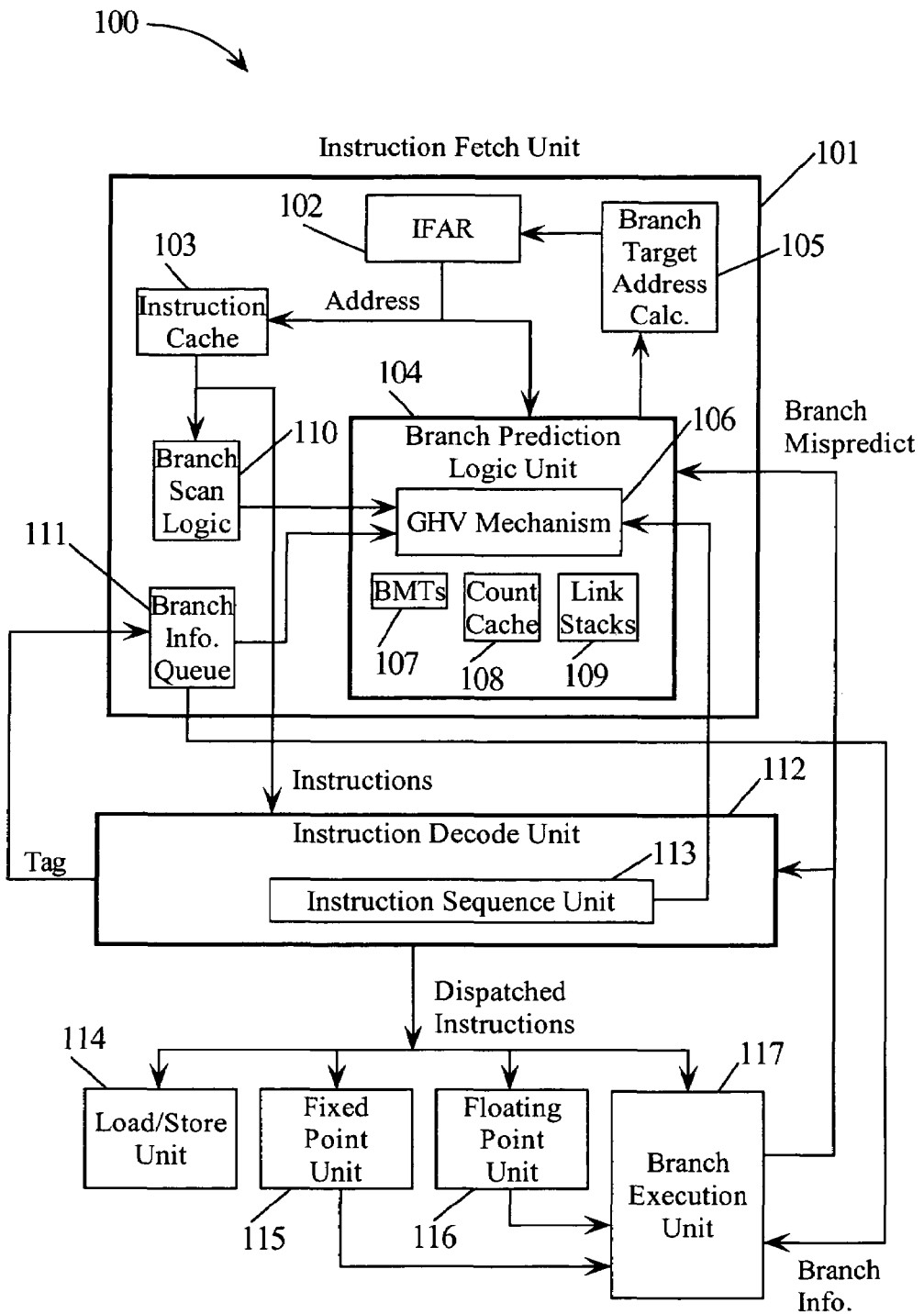
FIG. 1 illustrates a processor in accordance with an embodiment of the present invention.

FIG. 1 illustrates an embodiment of the present invention of a processor 100. Referring to FIG. 1, processor 100 may comprise an instruction fetch unit 101 comprising an instruction fetch address register (IFAR) 102 coupled to an instruction cache 103, a branch prediction logic unit 104, and a branch target address calculator 105. Branch prediction logic unit 104 may comprise a global history vector mechanism 106, branch history tables (BHTs) 107, a count cache 108 and link stacks 109. Instruction fetch unit 101 may further comprise a branch scan logic unit 10 coupled to instruction cache 103. Instruction fetch unit 101 may further comprise a branch information queue 111. Processor 100 may further comprise an instruction decode unit 112 coupled to instruction fetch unit 101. Instruction decode unit 112 may comprise an instruction sequencer unit 113. Processor 100 may further comprise execution units: load/store unit 114, fixed point unit 115, floating point unit 116 and branch execution unit 117. It is noted that processor 100 may include other and/or additional units that, for clarity, were not depicted. It is further noted that FIG. 1 is illustrative of an embodiment of processor 100 and FIG. 1 is not to be limited in scope to any one particular embodiment.

Referring to FIG. 1, IFAR 102 may be configured to receive each new instruction address, e.g., effective address representing an address from the program or compiler, such as from program counters (not shown) in a symmetric multithreading system. In one embodiment, the instruction address may specify a group or cache line of instructions, e.g., eight (8) instructions. The instruction corresponding to the received address may be accessed from instruction cache 103. Instruction cache 103 may be configured to store instructions. Further, if the address from IFAR 102 corresponds to a conditional branch instruction, then the address may be used by branch prediction logic unit 104 to predict if the corresponding conditional branch instruction will be taken or not taken.

Branch prediction logic unit 104 may predict if the corresponding conditional branch instructions will be taken or not taken by using a global history vector maintained by global history vector mechanism 106. The global history vector may refer to a vector of n bits of data used to represents the recent path of execution. For example, each bit of data may be associated with a group of instructions, e.g., eight (8) instructions, that had been fetched such as from instruction cache 103. If the group of instructions fetched contained a branch instruction whose branch was taken, then global history vector mechanism 106 may insert a "1" in the global history vector to indicate that a branch was taken corresponding to that group of instructions. Otherwise, global history vector mechanism 106 may insert a "0" in the global history vector. That is, a "0" may be indicated in the global history vector if the corresponding group of instructions did not contain a branch instruction or if the group of instructions did contain one or more conditional branch instructions and each of these branches were not taken. Upon each successive fetch of a group of instructions, global history vector mechanism 106 may update the global history vector by shifting in an appropriate "1" or "0" and discarding the oldest bit.

Branch prediction logic unit 104 may further comprise BHTs 107, count cache 108 and link stacks 109 to aid in predicting whether conditional branch instructions will be taken or not taken. Branch history tables 107 may contain counters which maintain a value which is used for making a prediction (taken/not taken) for the conditional branch instruction. Count cache 108 and link stacks 109 may refer to mechanisms used to predict target addresses for certain types of branch instruction where the target address cannot be directly determined from the instruction itself. Additional details regarding branch history tables 107, count cache 108 and link stacks 109 are disclosed in U.S. patent application Ser. Nos. 09/562,161; 09/631,726; and 09/434,856 entitled "Apparatus and Method for Recovering a Link Stack From Mis-Speculation", "Branch Prediction Circuits and Methods and Systems Using the Same" and "Apparatus and Method for Controlling Link Stack Corruption During Speculative Instruction Branching Using Multiple Stacks", respectively, which are incorporated by reference in their entirety herein.

If branch prediction logic unit 104 predicts that a conditional branch instruction will be taken, then branch target address calculator 105 calculates the target address for the conditional branch instruction which identifies an instruction stream beginning at an arbitrary location in memory.

If an instruction is a branch instruction, then information, e.g., global vector history, predicted direction, regarding that branch instruction may be stored in branch information queue 111.

Branch scan logic unit 110 may be configured to scan a copy of instructions fetched from instruction cache 103 to detect the presence of any branch instructions. Branch scan logic unit 110 may further be configured to transmit a command to global history vector mechanism 106 to return to a "normal mode" of operation and exit a "wait for branch mode" of operation if branch scan logic unit 110 detects a branch instruction. In the "normal mode" of operation, if the group of instructions fetched contained a branch instruction whose branch was taken, then global history vector mechanism 106 may insert a "1" into the "most recent" position in the global history vector to indicate that a branch was taken corresponding to that group of instructions, discard the "oldest" bit and shift the other bits one position in the direction associated with "older" fetch groups. If the group of instructions fetched did not contain a branch instruction whose branch was taken, global history vector mechanism 106 may insert a "0" in the global history vector, discard the oldest bit and shift the other bits one position in the direction associated with "older" fetch groups. That is, a "0" may be indicated in the global history vector if the corresponding group of instructions did not contain a branch instruction or if the group of instructions did contain one or more conditional branch instructions and each of these branches were not taken. A "wait for branch mode" refers to a mode of operation where global history vector mechanism 106 does not update the global history vector. A further discussion of both the "normal mode" and "wait for branch mode" of operation are discussed in further detail in conjunction with FIG. 2. Branch scan logic unit 101 may further be configured, as an added safeguard, to set a counter to a timeout value, t, and detect when the counter reaches zero as described in further detail in conjunction with FIG. 2.

Instructions may be retrieved from instruction cache 103 by instruction decode unit 112 to be decoded. Instruction decode unit 112 may comprise an instruction sequencer 113 configured to forward the decoded instructions to particular execution units, as described below, in an order determined by various algorithms. The decoded instructions may be forwarded to execution units: load/store unit 114, fixed point unit 115, floating point unit 116 and branch execution 117. Each execution unit may execute one or more instructions of a particular class of instructions. For example, fixed point unit 115 may execute fixed point mathematical and logic operations on source operands, such as adding, subtracting, ANDing, ORing and XORing. Floating point unit 116 may execute floating point operations on source operands, such as floating point multiplication and division. Load/store unit 114 may be configured to input information from a data cache (not shown) or system memory (not shown) in response to a load instruction. Further, load/store unit 114 may be configured to output information to a data cache (not shown) or system memory (not shown) in response to a store instruction. Branch execution unit 117 may execute conditional branch instructions and compare outcomes to predicted outcomes previously stored in branch information queue 111 to determine whether the conditional branch had been predicted correctly.

In the event that a conditional branch was predicted incorrectly, information about that conditional branch is retrieved from branch information queue 111. This information may be used to restore the states of branch prediction logic unit 104 to the states they would have been if the conditional branch instruction had been predicted correctly. Any instructions that followed the mispredicted branch are discarded. The discarding of instructions in the event of a branch mispredict may be referred to as a "branch flush." Further, any information in branch information queue 111 about branches that followed the mispredicted branch is likewise discarded by the resetting of the next-to-write pointer.

As stated in the Background Information section, in the event of a "non-branch" flush operation, the global history vector may be discarded. A non-flush may refer to a flush operation (discarding of all instructions between the most recently fetched instructions and some instructions fetched earlier) not resulting from a branch misprediction, i.e., not resulting from an incorrectly predicted instruction stream. For example, a non-branch flush operation may be enacted to handle a "livelock" situation such as when a thread in a multi-thread system cannot make forward progress because of a resource being locked. In another example, a non-branch flush operation may be enacted when a system call instruction is fetched and later identified after a number of instructions had been fetched. The instructions fetched after the system call was fetched may have to be flushed. The global history vector may be recoverable in a non-branch flush if the flush is to a fetch group (group of instructions fetched) that contains a branch instruction. The global history vector may be recoverable as a copy of the global history vector may have been stored in the branch issue queue for that branch instruction. However, the global history vector is not recoverable in a non-branch flush if the flush is to a fetch group that does not contain a branch instruction. The branch information queue may only contain a copy of the global history vector for a branch instruction. Consequently, a new global history vector must be reconstructed. If the global history vector is n bits long, then it will require n correctly predicted fetches to be reconstructed. If a correct prediction as to whether a conditional branch instruction should be taken or not taken depends on the global history vector, then branch mispredictions may occur until the global history vector has finished being reconstructed. If non-branch flushes are frequent, then frequent branch mispredictions may occur thereby adversely affecting performance. Therefore, there is a need in the art to recover a global history vector in the event of a non-branch flush to a fetch group of instructions that contains no branch instructions. The global history vector may be recovered in the event of a non-branch flush to a fetch group of instructions that contains no branch instructions using the method as described below in conjunction with FIG. 2.

Figure 2A:
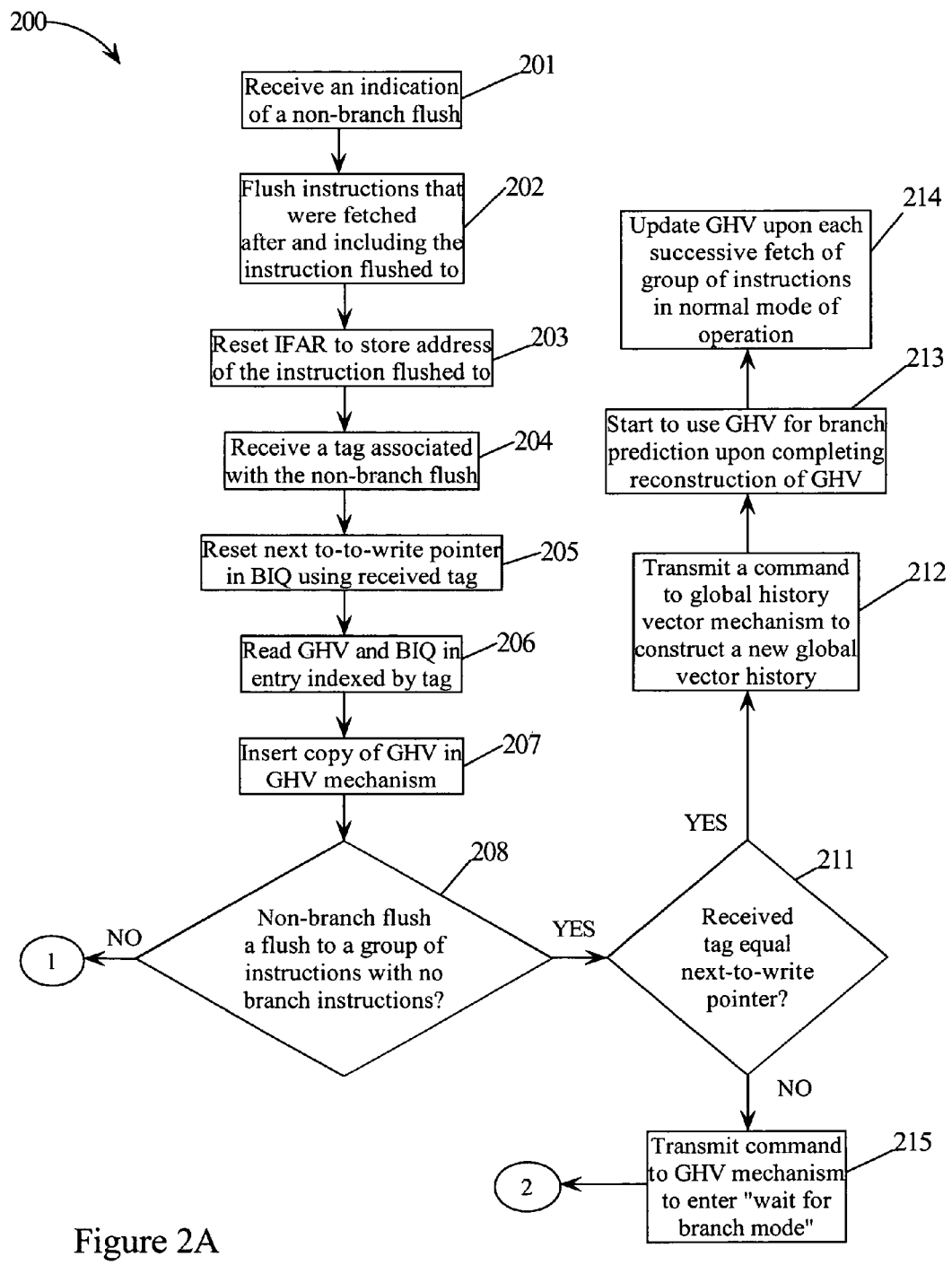
FIG. 2 is a flowchart of a method for recovering a global history vector in the event of a non-branch flush to a fetch group of instruction that contains no branch instructions in accordance with an embodiment of the present invention.
Figure 2B:
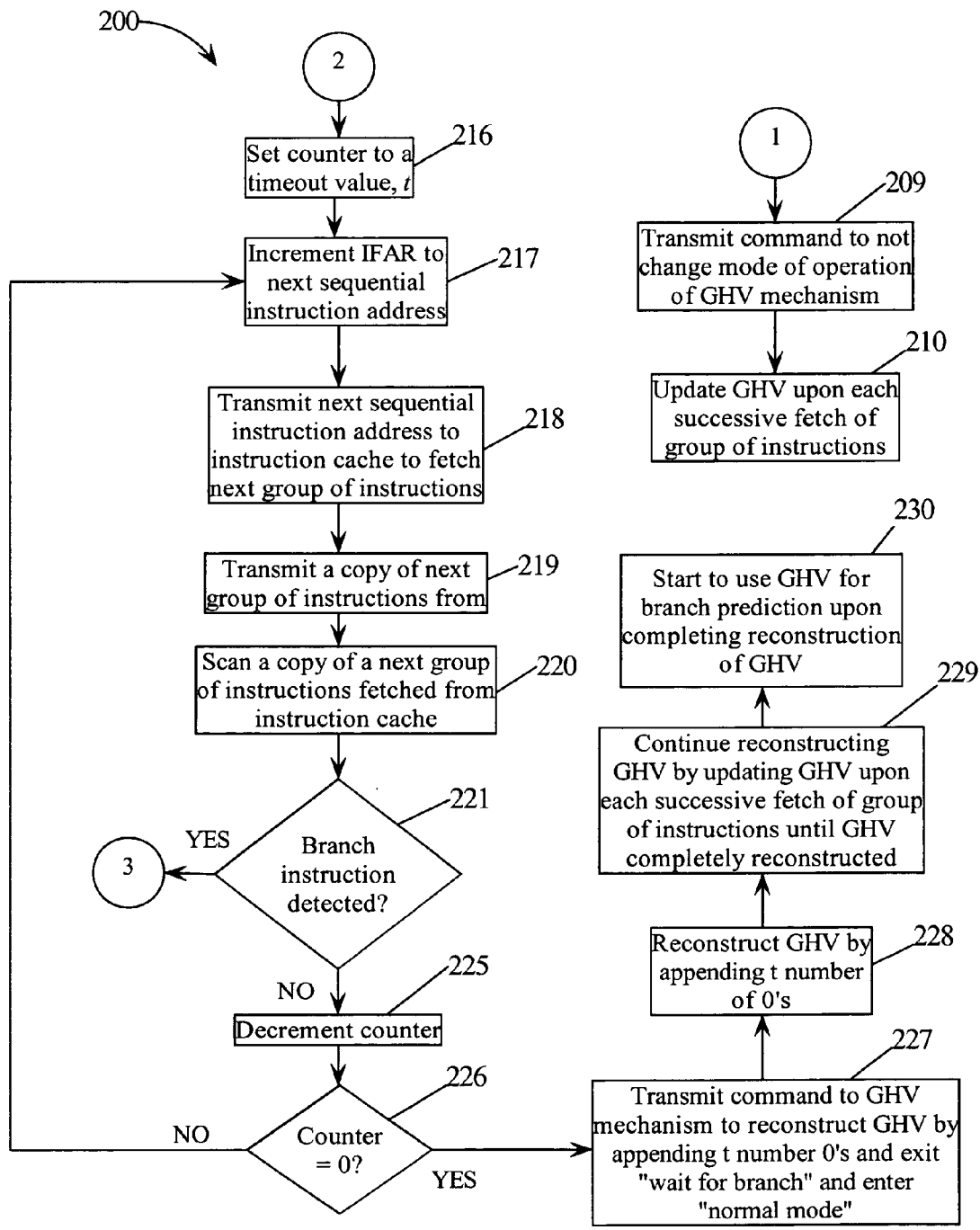
Figure 2C:
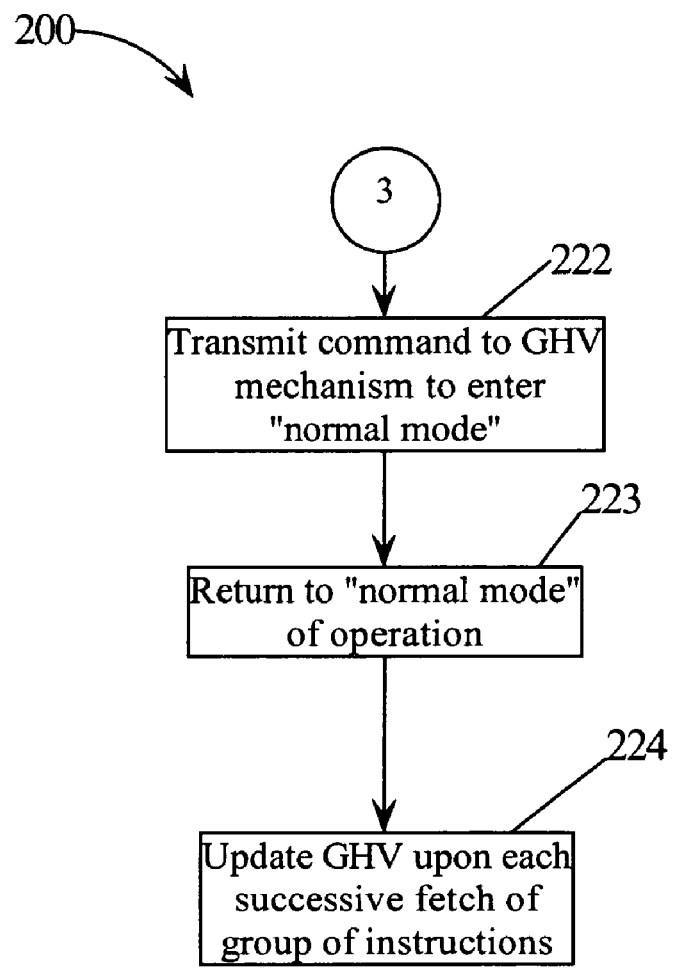

It is noted that the units of processor 100 that are identified in FIG. 2 contain logic to perform the indicated steps of the method described in FIG. 2.

FIG. 2—Method for Recovering a Global History Vector in the Event of a Non-Branch Flush to a Fetch Group of Instructions that Contains no Branch Instructions FIG. 2 is a flowchart of one embodiment of the present invention of a method for recovering a global history vector in the event of a non-branch flush to a fetch group of instructions that contains no branch instructions in Referring to FIG. 2, in conjunction with FIG. 1, in step 201, in the event of a non-branch flush, an indication of such a flush is received by global history vector mechanism 106 from instruction sequencer unit 113.

In step 202, all instructions that were fetched after and including the instruction being flushed to are flushed, i.e., discarded, by instruction sequencer unit 112. In step 203, IFAR 102 is reset to store the address of the instruction flushed to.

In step 204, branch information queue 111 receives a tag, e.g., 5-bit number, associated with the non-branch flush from instruction sequencer unit 113. In one embodiment, the tag may be used as a pointer to a particular entry in branch information queue 111. In step 205, the next-to-write pointer in branch information queue 111 is reset using the tag received in step 204 to the state it had been in before the discarded instructions had been fetched. In one embodiment, all or a portion of the bits in the tag may be used to replace the next next-to-write pointer. In one embodiment, the next next-to-write pointer may point to the next entry in branch information queue 111 to be written. That is, the next next-to-write pointer may point to the next entry in branch information queue 111 to store information regarding a branch instruction.

In step 206, branch information queue 111 reads a copy of the global history vector in the entry in branch information queue 111 indexed by the tag. As stated above, an entry in branch information queue 111 may store information about a branch instruction including a copy of the global history vector associated with that branch instruction. In step 207, branch information queue 111 inserts the copy of the read global history vector in global history vector mechanism 106.

In step 208, instruction sequencer unit 113 makes a determination as to whether the non-branch flush was a flush to a group of instruction with no branch instructions. If the non-branch flush was a flush to a group with a branch instruction, as illustrated in FIG. 3, then, in step 209, branch information queue 111 transmits a command to global history vector mechanism 106 to continue operating in the normal mode using the global history vector recovered in step 207.

Figure 3:
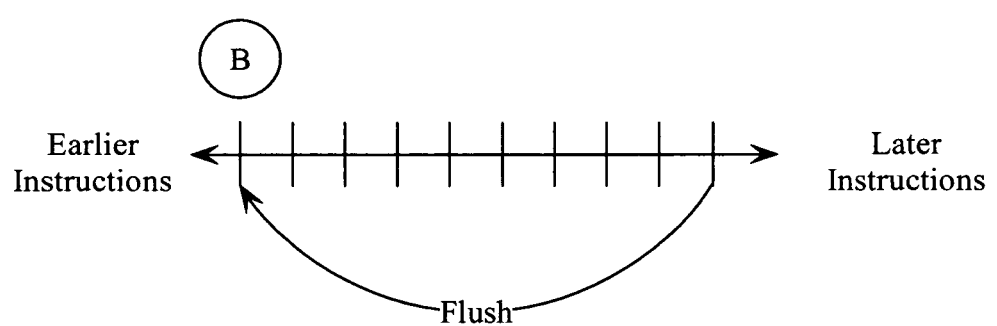
FIG. 3 illustrates a non-branch flush to a fetch group of instructions containing a branch instruction in accordance with an embodiment of the present invention.

Referring to FIG. 3, FIG. 3 illustrates a flush to a group of instructions with a branch instruction in accordance with an embodiment of the present invention. As illustrated in FIG. 3, the address flushed to was to a group of instructions with a branch instruction (identified by a B with a circle) previously fetched. In one embodiment, instruction sequencer unit 113 determines that the non-branch flush was a flush to a group of instruction with a branch instruction.

Returning to FIG. 2, in conjunction with FIG. 1, in step 210, global history vector mechanism 106 continues to update the global history vector upon each successive fetch of a group of instructions.

If, however, the non-branch flush was a flush to a group with no branch instructions, then, in step 211, branch information queue 111 determines if the next-to-write pointer in branch information queue 111 was changed in step 205. That is, branch information queue 111 determines if the tag used to reset the new next-to-write pointer also identified the next-to-write pointer prior to the flush. As stated above, in one embodiment, all or a portion of the bits in the tag may be used to identify the next-to-write pointer. Hence, branch information queue 111 determines in step 211 if the identified new next-to-write pointer is the same as the next-to-write pointer prior to step 205.

Figure 4:
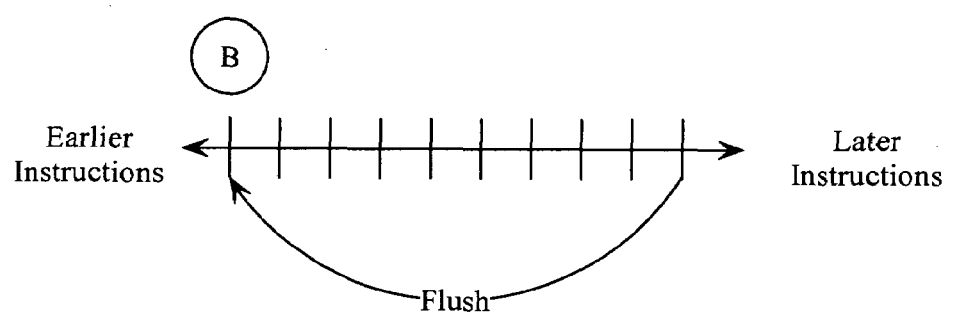
FIG. 4 illustrates a non-branch flush to a fetch group of instructions that does not contain a branch instruction with no branch instructions fetched between the address flushed to and the last address fetched at the time of the non-branch flush in accordance with an embodiment of the present invention.

If the tag received in step 204 equals the next-to-write pointer, as illustrated in FIG. 4, then, in step 212, branch information queue 111 transmits to global history vector mechanism 106 a command to construct a new global history vector as the global history vector may be lost. In this case, global branch prediction may not be used for n correctly predicted fetches, where n is the length of the global history vector.

Referring to FIG. 4, FIG. 4 illustrates a flush to a group of instructions with no branch instructions between the address that was flushed to and the last address fetched at the time of the non-branch flush in accordance with an embodiment of the present invention. As illustrated in FIG. 4, there are no branch instructions between the address that was flushed to and the last address fetched at the time of the non-branch flush. In one embodiment, such a case may be identified when the tag received in step 304 equals the next-to-write pointer. If the tag received in step 304 equals the next-to-write pointer, then no branch information has been written to branch information queue 111 by any of the flushed instructions. Further, if the tag received in step 304 equals the next-to-write pointer, then the next-to-write pointer points to an empty or meaningless entry in branch information queue 111.

Returning to FIG. 2, in conjunction with FIG. 1, in step 213, the global history vector is used by branch prediction logic unit 104 upon completion of the construction of a new global history vector. In step 214, global history vector mechanism 106 updates the global history vector upon each successive fetch of a group of instruction in the normal mode of operation.

Figure 5:
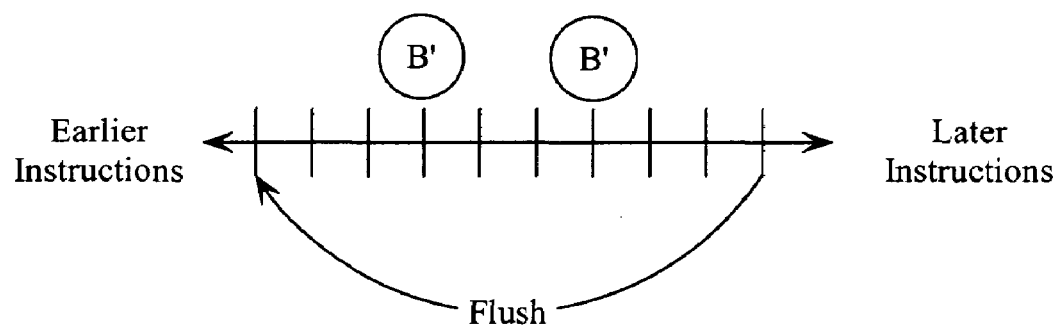
FIG. 5 illustrates a non-branch flush to a fetch group of instructions that does not contain a branch instruction with a branch instruction fetched between the address flushed to and the last address fetched at the time of the non-branch flush in accordance with an embodiment of the present invention.

Returning to step 211, if branch information queue 111 determines that the tag received in step 204 does not equal the next-to-write pointer, then, in step 215, branch information queue 111 transmits a command to global history vector mechanism 106 to enter a "wait for branch mode." Branch information queue 111 may determine that the tag received in step 204 does not equal the previous next-to-write pointer when there has been a flush and a branch instruction is among those instructions that have been flushed, between the address flushed to and the last instruction fetched at the time of the non-branch flush, as illustrated in FIG. 5.

Referring to FIG. 5, FIG. 5 illustrates a flush to a group of instructions with no branch instructions where a branch instruction had been fetched between the address flushed to and the last address fetched at the time of the non-branch flush in accordance with an embodiment of the present invention. As illustrated in FIG. 5, the addressed flushed to was to a group of instructions with no branch instructions. Further, as illustrated in FIG. 5, at least one branch instruction (identified by a B' and a B with a circle around them) had been fetched between the address flushed to and the last address fetched at the time of the non-branch flush. Since there has been at least one branch instruction that was fetched between the address flushed to and the last address fetched at the time of the non-branch flush, the tag received in step 304 identifies the entry in branch information queue 111 associated with the branch instruction (identified by the B' with a circle around it) previously fetched that is closest to but not before the address flushed to and not following the last address fetched at the time of the non-branch flush.

Returning to FIG. 2, in conjunction with FIGS. 1 and 5, as stated above, if branch information queue 111 determines that the tag received in step 204 does not equal the previous next to next-to-write pointer, then, in step 215, branch information queue 111 transmits a command to global history vector mechanism 106 to enter a "wait for branch mode." A "wait for branch mode" refers to a mode of operation where global history vector mechanism 106 does not update the global history vector because the global history vector will not correctly represent the path of execution until the next branch instruction (indicated by B'with a circle around it in FIG. 5) is fetched. Since there are no conditional branch instructions between the instruction flushed to until the next branch instruction fetched, the global history vector will not be needed. Further, since there are no branch instructions between the instruction flushed to until the next branch instruction fetched, the global history vector will be valid upon fetching the next branch instruction. The global history vector will be valid upon fetching the next branch instruction as a copy of the global history vector was previously stored in branch information queue 111 associated with this branch instruction. As discussed below, upon fetching the next branch instruction, global history vector mechanism 106 returns to the normal mode of operation to continue updating the global history vector. Hence, by having global history vector mechanism 106 enter the "wait for branch mode" of operation upon the occurrence of a non-branch flush to a fetch group that does not contain a branch instruction, the global history vector may be recovered upon the fetching of the next branch instruction following the flush operation of step 202.

Returning to FIG. 2, in conjunction with FIG. 1, in step 216, global history vector mechanism 106 may optionally set a counter to a timeout value, t, as a safeguard against certain rare occurrences involving self-modifying code. In step 217, IFAR 202 is incremented to the next sequential instruction address. In step 218, IFAR 202 transmits the next sequential instruction address to instruction cache 203 to fetch the next group of instructions.

In step 219, instruction cache 203 transmits a copy of the next group of instructions to branch scan logic unit 110 following the flush operation of step 202 from instruction cache 103.

In step 220, branch scan logic unit 110 scans a copy of the next group of instructions fetched from instruction cache 103. In step 221, branch scan logic unit 110 determines if any of the instructions fetched is a branch instruction. If any instruction fetched is a branch instruction, then, in step 222, branch scan logic unit 110 transmits a command to global history vector mechanism 106 to exit the "wait for branch mode" and enter the "normal mode" of operation.

In step 223, global history vector mechanism 106 exits the "wait for branch mode" and enters the "normal mode" of operation. In the "normal mode" of operation, if the group of instructions fetched contained a branch instruction whose branch was taken, then global history vector mechanism 106 may insert a "1" in the global history vector to indicate that a branch was taken corresponding to that group of instructions. Otherwise, global history vector mechanism 106 may insert a "0" in the global history vector. That is, a "0" may be indicated in the global history vector if the corresponding group of instructions did not contain a branch instruction or if the group of instructions did contain one or more conditional branch instructions and each of these branches were not taken.

In step 224, upon returning to the normal mode of operation, global history vector mechanism 106 may update the global history vector upon each successive fetch of a group of instructions by shifting in an appropriate "1" or "0" and discarding the oldest bit.

Returning to step 221, if the branch scan logic unit 110 determines that the instructions fetched do not contain a branch instruction, then, in step 225, global history vector mechanism 106 decrements the counter, i.e., decrements the counter by one (1). In step 226, branch scan logic unit 110 determines if the counter equals zero. If the counter does not equal zero, then global history vector mechanism 106 remains in "wait for branch mode" and IFAR 202 is incremented to the next sequential instruction address in step 217.

If, however, the timeout counter equals zero, then, in step 227, global history vector mechanism 106 may partially construct a new global history vector by appending t zero's to the global history vector and then continue constructing the new global history vector by shifting in an appropriate "1" or "0" following the appended t zero's upon each successive fetch group of instructions until the entire new global history vector has been reconstructed. In so doing, a global history vector n bits long may only require an additional (n-t) fetches to complete construction of the new global history vector.

In step 228, global history vector mechanism 106 reconstructs the global history vector by updating the global history vector by appending t zero's. In step 229, global history vector mechanism 106 continues to reconstruct the global history vector by shifting in an appropriate "1" or "0" following the appended t zero's upon each successive fetch group of instructions until the entire global history vector has been reconstructed. In step 230, the global history vector is used by branch prediction logic unit 104 upon completion of the reconstruction of the new global history vector.

It is noted that method 200 may include other and/or additional steps that, for clarity, are not depicted. It is noted that method 200 may be executed in a different order presented and that the order presented in the discussion of FIG. 2 is illustrative. It is further noted that certain steps in method 200 may be executed in a substantially simultaneous manner. It is further noted that certain steps in method 200 are optional to recover a global history vector in the event of a non-branch flush to a fetch group of instruction that contains no branch instructions such as the steps related to the timeout counter.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for recovering a global history vector in the event of a non-branch flush comprising the steps of:
   receiving a tag, wherein said tag is associated with a flush operation;
   resetting a next-to-write pointer in a queue using said received tag;
   reading a global history vector from said queue in an entry indexed by said tag;
   inserting a copy of said global history vector read into a global history vector mechanism, wherein said global history vector mechanism is configured to update said global history vector in a first mode; and
   transmitting a command to said global history vector mechanism to enter a second mode if said flush operation is a flush to a group of instructions that contains no branch instructions and said tag does not equal said next-to-write pointer, wherein said global history vector mechanism does not update said global history vector in said second mode.

2. The method as recited in claim 1, wherein said command is transmitted to said global history vector mechanism to enter said second mode if said tag points to an entry in said queue containing information regarding a branch instruction previously fetched between an address flushed to and a last address fetched at a time of said flush operation.

3. The method as recited in claim 1, wherein if said flush operation is a flush to a group of instructions that contains no branch instructions and said tag does not equal said next-to-write pointer then the method further comprises the steps of:
   scanning a copy of a selected instruction; and
   determining if said selected instruction is a branch instruction;
   wherein if said first instruction is not said branch instruction, then the method further comprises the step of:
   scanning a copy of a next instruction.

4. The method as recited in claim 3, wherein if said selected instruction is a branch instruction, then the method further comprises the step of:
   transmitting a command to said global history vector mechanism to enter said first mode of operation.

5. The method as recited in claim 4, wherein if said first instruction is said branch instruction, then the method further comprises the step of:
   updating said global history vector upon each successive fetch of a group of instructions in said first mode.

6. The method as recited in claim 1, wherein if said flush operation is a flush to a group of instructions that contains a branch instruction then the method further comprises the step of:
   transmitting a command to said global history vector mechanism to continue operation in said first mode.

7. The method as recited in claim 1, wherein if said flush operation is a flush to a group of instructions that contains no branch instructions and said tag does not equal said next-to-write pointer then the method further comprises the steps of:
   setting a counter to a predetermined value;
   transmitting an instruction; and
   decrementing said counter if said instruction transmitted is not a branch instruction.

8. The method as recited in claim 7, wherein if said flush operation is a flush to a group of instructions that contains no branch instructions and said tag does not equal said next-to-write pointer then the method further comprises the step of:
   determining if said counter equals zero, wherein if said counter equals zero then the method further comprises the step of:
   transmitting a command to said global vector history mechanism to reconstruct said global history vector.

9. The method as recited in claim 8, wherein if said counter equals zero then the method further comprises the step of:
   reconstructing said global history vector by appending a number of zero's in said global history vector, wherein said number equals said predetermined value.

10. The method as recited in claim 9, wherein if said counter equals zero then the method further comprises the step of:
    continuing reconstructing said global history vector by updating said global history vector upon each successive fetch of a group of instructions.

11. A system, comprising:
    an instruction fetch unit configured to fetch instructions, wherein said instruction fetch unit comprises:
    a branch prediction logic unit, wherein said branch prediction logic unit is configured to predict if a branch instruction will be taken or not taken, wherein said branch prediction logic unit comprises:

a group history vector mechanism configured to manage a group history vector; and a queue coupled to said branch prediction logic unit, wherein said queue is configured to store information about branch instructions, wherein said queue comprises:

logic for receiving a tag, wherein said tag is associated with a flush operation;

logic for resetting a next-to-write pointer in said queue using said received tag;

logic for reading said global history vector from said queue in an entry indexed by said tag; and logic for transmitting a command to said global history vector mechanism to enter a second mode if said flush operation is a flush to a group of instructions that contains no branch instructions and said tag does not equal said next-to-write pointer, wherein said global history vector mechanism does not update said global history vector in said second mode.

12. The system as recited in claim 11, wherein said command is transmitted to said global history vector mechanism to enter said second mode if said tag points to an entry in said queue containing information regarding a branch instruction previously fetched between an address flushed to and a last address fetched at a time of said flush operation.

13. The system as recited in claim 11, wherein said instruction fetch unit further comprises:

a branch scan logic unit coupled to said branch prediction logic unit, wherein said branch scan logic unit comprises:

logic for scanning a copy of a selected instruction if said flush operation is a flush to a group of instructions that contains no branch instructions and said tag does not equal said next-to-write pointer;

logic for determining if said selected instruction is a branch instruction; and logic for scanning a next instruction if said first instruction is not said branch instruction.

14. The system as recited in claim 13, wherein said branch scan logic unit further comprises:

logic for transmitting a command to said global history vector mechanism to enter said first mode if said first instruction is said branch instruction.

15. The system as recited in claim 14, wherein said global history vector mechanism comprises:

logic for updating said global history vector upon each successive fetch of a group of instructions in said first mode.

16. The system as recited in claim 11, wherein said queue further comprises:

logic for transmitting a command to said global history vector mechanism to continue operation in said first mode if said flush operation is a flush to a group of instructions that contains a branch instruction.

17. The system as recited in claim 11, wherein said global history vector mechanism comprises:

logic for setting a counter to a predetermined value if said flush operation is a flush to a group of instructions that contains no branch instructions and said tag does not equal said next-to-write pointer;

wherein said instruction fetch unit further comprises:

a cache memory, wherein said cache memory comprises:

logic for transmitting an instruction if said flush operation is a flush to a group of instructions that contains no branch instructions and said tag does not equal said next-to-write pointer; and wherein said global history vector mechanism further comprises:

logic for decrementing said counter if said instruction transmitted is not a branch instruction.

18. The system as recited in claim 17, wherein said instruction fetch unit further comprises:

a branch scan logic unit coupled to said cache memory, wherein said branch scan logic unit comprises:

logic for determining if said counter equals zero if said flush operation is a flush to a group of instructions that contains no branch instructions and said tag does not equal said next-to-write pointer; and logic for transmitting a command to said global vector history mechanism to reconstruct said global history vector if said counter equals zero.

19. The system as recited in claim 18, wherein said group history vector mechanism further comprises:

logic for reconstructing said global history vector by appending a number of zero's in said global history vector if said counter equals zero, wherein said number equals said predetermined value.

20. The system as recited in claim 19, wherein said group history vector mechanism further comprises:

logic for continuing reconstructing said global history vector by updating said global history vector upon each successive fetch of a group of instructions if said counter equals zero.

* * * * *